United States Patent [19]
Grisamore et al.

[11] Patent Number: 6,132,055
[45] Date of Patent: Oct. 17, 2000

[54] BARBECUE LIGHT

[76] Inventors: Greg E. Grisamore, The Ranch, 35241 Mulholland Hwy., Malibu, Calif. 90265; James R. Gates, 956 Green Oak La., Glendora, Calif. 91740

[21] Appl. No.: 09/100,796

[22] Filed: Jun. 19, 1998

[51] Int. Cl.[7] .................................................... F21V 33/00
[52] U.S. Cl. ............................................. 362/92; 362/253
[58] Field of Search .............................. 362/92, 93, 94, 362/253

[56] References Cited

U.S. PATENT DOCUMENTS

| 2,470,645 | 5/1949 | Reichart | 362/92 X |
|---|---|---|---|
| 5,257,169 | 10/1993 | Walendziak | 362/92 |
| 5,664,875 | 9/1997 | Hegedus | 362/191 |

*Primary Examiner*—Stephen Husar
*Attorney, Agent, or Firm*—Price Gess & Ubell

[57] ABSTRACT

A handle assembly mountable to a barbecue lid and which includes an integral light positioned to shine upon the cooking surface of the barbecue when the barbecue lid has been so positioned as to expose the cooking surface.

32 Claims, 3 Drawing Sheets

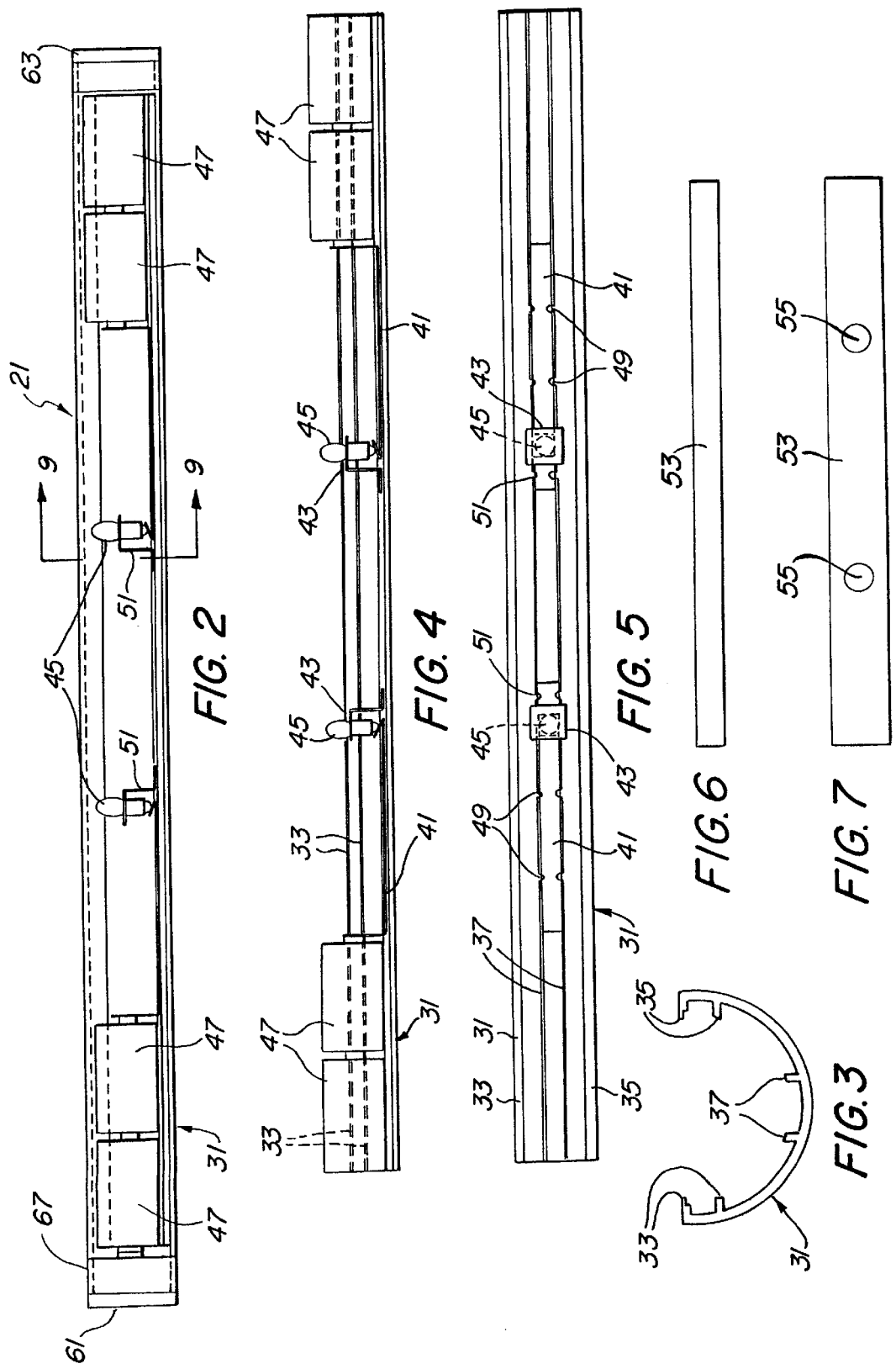

BARBECUE LIGHT

BACKGROUND OF THE INVENTION

1. Field of the Invention

The subject invention relates generally to a lighting apparatus and more particularly to a combination handle/light assembly for barbecues.

2. Description of Related Art

The lighting of conventional barbecues so as to permit the cooking surface to be viewed at night has presented considerable difficulties. Some approaches have included the provision of a tripod with lights mounted on it, the attaching of a light to a nearby post or wail, or the attaching of a clamp-on bendable extension light to a nearby tray or other physical object In addition to being cumbersome, awkward and expensive, such lighting arrangements are typically positioned such that shadows are cast on the cooking surface so as to obscure the desired view of food items being cooked.

OBJECTS AND SUMMARY OF THE INVENTION

Accordingly, it is an object of the invention to provide an improved barbecue lighting apparatus;

It is another object of the invention to provide barbecue lighting apparatus which is simple and convenient to use;

It is yet another object of the invention to provide barbecue lighting apparatus which eliminates the shadow problems of the prior art.

These and other objects and advantages are achieved according to the invention by provision of a handle assembly mountable to the barbecue lid which includes an integral light positioned to shine upon the cooking surface of the barbecue when the barbecue lid has been so positioned as to expose the cooking surface. The barbecue handle/light assembly is preferably mountable by removal of the conventional handle from the barbecue lid and attaching an assembly constructed according to the invention in place of the conventional handle. Alternatively, the handle may be made adaptable to be connected to the handle mounting hardware provided by the manufacturer of the barbecue lid or otherwise attached.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein:

FIG. 2 is a side view of the tube portion of the assembly of FIG. 1;

FIG. 3 is an end view of an inner housing component according to the preferred embodiment;

FIG. 4 is a side view of the inner housing component of the preferred embodiment with various interior components installed therein;

FIG. 5 is a top view of FIG. 4;

FIG. 6 is a side view of a reflector component of the preferred embodiment;

FIG. 7 is a top view of the reflector component of FIG. 4;

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a combination handle/barbecue light assembly adapted for a particular type of barbecue and employing only one of many possible interior mounted light sources.

Figure 1:
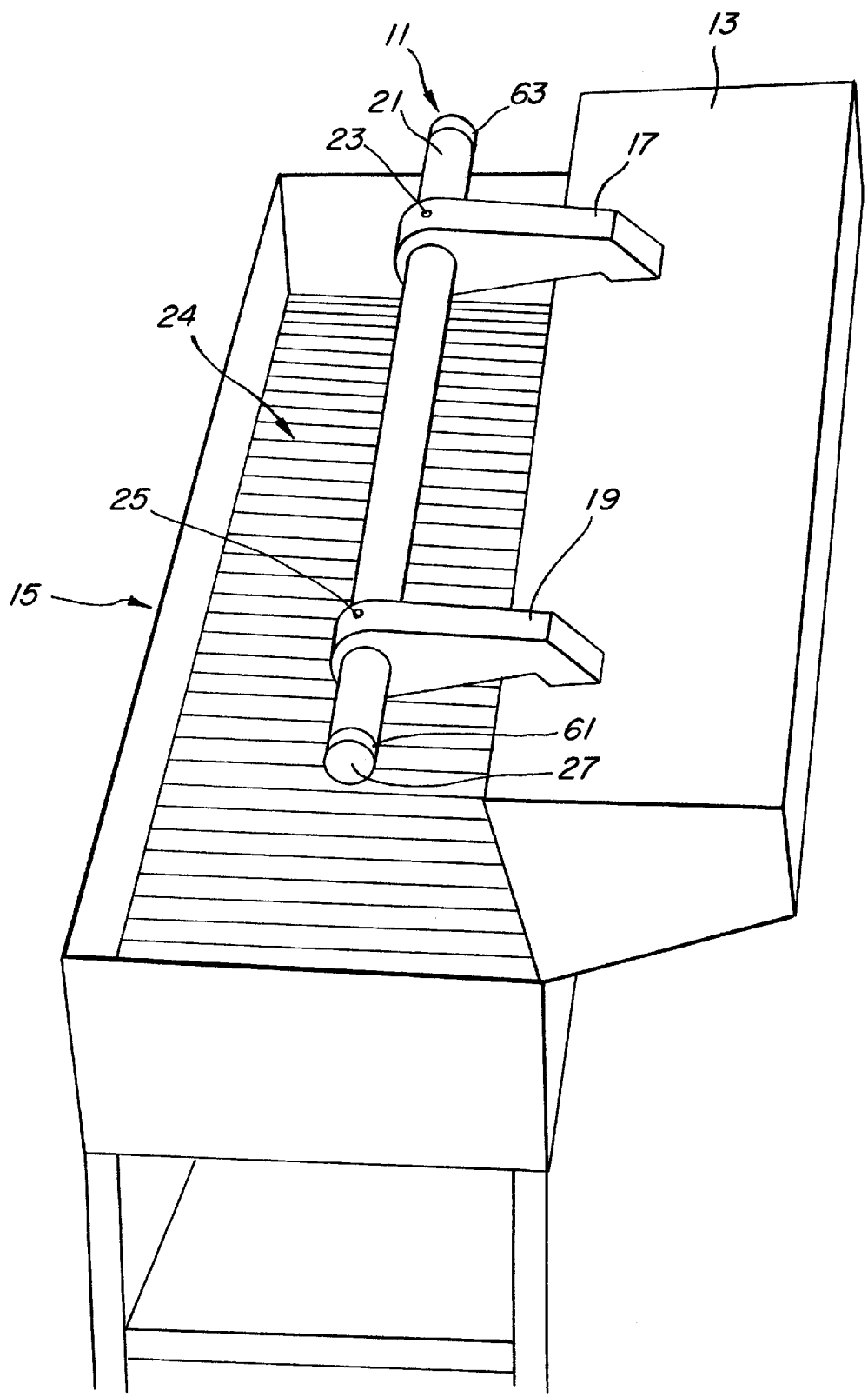
FIG. 1 is a perspective view illustrating a barbecue light assembly according to the preferred embodiment installed on a conventional barbecue.

FIG. 1 illustrates a combination handle/barbecue light assembly 11 attached to a pivotable lid 13 of a barbecue 15. The assembly 11 includes first and second mounting brackets 17, 19 shaped to position a light-containing tube 21 above the cooking surface 24 of the barbecue 15. The mounting brackets 17, 19 may be specially designed or may be those provided as part of the barbecue. A single mounting bracket may also be used, for example, centrally positioned on the tube 21. The tube 21 may be fixed to the brackets 17, 19 by conventional set screws 23, 25 or other conventional fastening means.

FIG. 1 further illustrates an on/off switch 27 used to activate a light source contained in tube 21. That light source is directed downwardly on the surface 24 and is therefore not visible in the view of FIG. 1.

Figure 8:
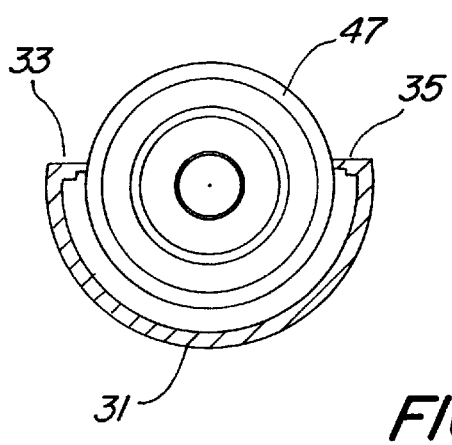
FIG. 8 is an end view of the inner housing with battery installed.

The light-containing tube 21 is shown in more detail in FIG. 2. The tube 21 includes a clear plastic outer housing 67, an inner housing or mounting cradle 31, and first and second end caps 61, 63. The mounting cradle 31 is a semicircular cross-section as shown in FIG. 3 and runs substantially the length of the tube 21. The housing 31 supports four batteries 47, first and second positive contact bars 41 and first and second lamp holders or retainers 51. As further illustrated in FIG. 3, the mounting cradle 31 includes first and second side channels and a base channel formed respectively by pairs of projections 33, 35, 37. The batteries 47 are supported by these respective pairs of projections 33, 35, 37, as particularly illustrated in FIG. 8.

As illustrated in FIG. 5, the positive contact bars 41 and the bulb retainers 43 may be held in position by suitable crimps 49, 51 in the base channel 37. Other conventional means of retaining such components will, of course, be apparent to those skilled in the art.

Figure 9:
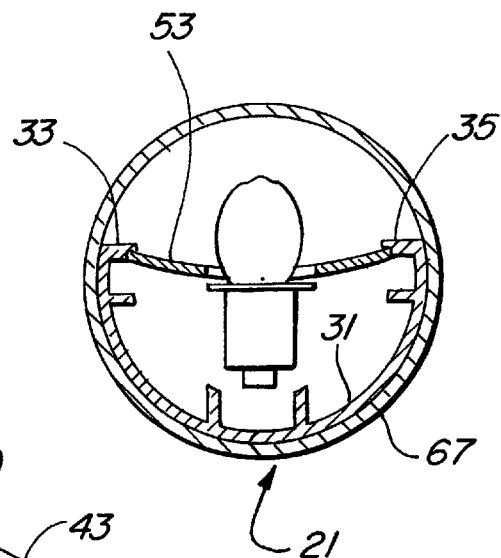
FIG. 9 is a cross-sectional view taken at 9—9 of FIG. 2.

FIGS. 6 and 7 illustrate a reflector component 53 of arcuately curved cross-section and which includes apertures 55 positioned to permit insertion of respective lamps 45 therethrough. As shown in FIG. 9, the reflector 53 is retained in position by suitable underlying indentations in the topmost projection of each of the horizontal pairs of projections 33, 35. FIG. 9 further illustrates the respective shape and positioning of the inner housing 31 within the outer housing 67 of the tube 21. The inner housing 31 is preferably a rigid extrusion of material such as vinyl and is opaque and of a dark color such as black. The outer housing 67 may be a clear plastic tube.

Figure 10:
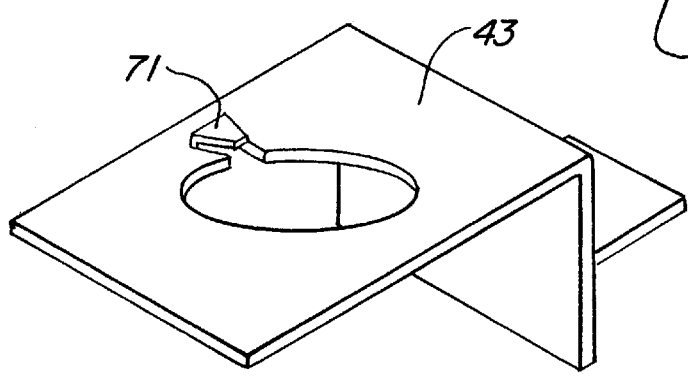
FIG. 10 is a perspective view of a lamp retainer component.
Figure 11:
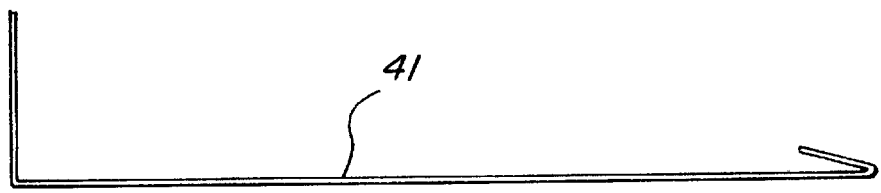
FIG. 11 is a side view of a positive contact bar component.

FIG. 10 illustrates a perspective view of the bulb retainer 43 and particularly shows a lance element 71 conventionally used to interconnect with a bulb or lamp 45. The bulb retainer 43 includes first and second horizontal surfaces integrally formed with a vertical surface. FIG. 11 illustrates one of the positive contact bars 41 in greater detail. These components are connected by suitable electrical conductors to form an electric circuit such that switch 27 may turn the bulbs 45 or other light source "on" or "off". Such a circuit may be similar to a typical flashlight or may include a ballast for a flourescent source.

Those skilled in the art will appreciate that various adaptations and modifications of the just-described preferred embodiment can be configured without departing from the scope and spirit of the invention. For example, while one particular configuration for establishing a light-producing source within the tube 21 is depicted in FIGS. 2–5, various other well known light generation means may be used, without departing from the scope and spirit of the invention. Various attachment mechanisms may also be provided for attachment to various shapes and styles of barbecue lids. Therefore, it is to be understood that, within the scope of the appended claims, the invention may be practiced other than as specifically described herein.

What is claimed is:

1. An apparatus for mounting to the lid of a cooking apparatus comprising:
   an elongated tube having an exterior surface shaped to provide a gripping surface grippable to open and close said lid, said tube having at least one light source mounted therein, the tube and light source forming a single piece handle-light; and
   a bracket attached to said tube and to said lid, said bracket positioning said tube such that said tube is manually graspable to manually open said lid, and such that the light source mounted in said tube is positioned to illuminate said cooking surface when said lid is open.

2. The apparatus of claim 1 wherein said tube includes plastic outer housing, and an inner housing.

3. The apparatus of claim 1 wherein said inner housing is semicircular in cross-section and runs substantially the length of the tube.

4. The apparatus of claim 3, wherein said housing supports a plurality of batteries, first and second positive contact bars, and first and second lamp holders.

5. The apparatus of claim 3 wherein said housing includes first and second side channels and a base channel formed respectively by three pairs of projections.

6. The apparatus of claim 5 wherein one or more batteries are supported by the respective pairs of projections.

7. The apparatus of claim 6 further including first and second end caps closing respective ends of said tube.

8. The apparatus of claim 6 further including switch means for turning on and off light provided by said light source.

9. The apparatus of claim 1 wherein said elongated tube is attached parallel to a surface of said lid by said bracket.

10. In combination:
    a cooking apparatus having a lid openable to expose a cooking surface disposed beneath said lid;
    an elongated tube having an exterior surface sized and shaped to provide a manually graspable surface, said tube having at least one light source mounted therein; and
    a bracket attached to said tube and to said lid, said bracket positioning said tube parallel to a surface of said lid such that said tube is manually graspable to open said lid and such that said light source illuminates said grill when said lid is open, said tube being the only component lying parallel to said lid and graspable to open said lid.

11. The apparatus of claim 10 wherein said tube includes a plastic outer housing and an inner housing.

12. The combination of claim 11 wherein said inner housing is semicircular in cross-section and runs substantially the length of the tube.

13. The combination of claim 12 wherein said housing includes first and second side channels and a base channel formed respectively by three pairs of projections.

14. The combination of claim 13 wherein one or more batteries are supported by the respective pairs of projections.

15. The combination of claim 10 further including first and second end caps closing respective ends of said tube.

16. The combination of claim 10 wherein said light source is positioned to direct light transversely to an axis of said elongated tube.

17. The combination of claim 16 wherein said axis lies parallel to a surface of said lid.

18. An apparatus comprising:
    a handle assembly comprising an elongated cylindrical clear plastic outer tube adapted to be mounted to a lid of a cooking apparatus, an inner housing of semicircular cross-section, said cross-section being of a radius selected such that said inner housing slides into said cylindrical tube and mates flush with an inner surface thereof, said inner housing including a means for supporting a plurality of batteries therein and means for mounting a light source therein, said tube including a light transmissive portion positioned to permit said light source to illuminate a cooking surface of the cooking apparatus when said lid is in a position which exposes said cooking surface.

19. The apparatus of claim 18 further including mounting bracket means for attached said handle assembly to said lid.

20. The apparatus of claim 19 wherein said means for supporting includes first and second side channels and a base channel formed respectively by three pairs of projections.

21. The apparatus of claim 20 further including first and second end caps closing respective ends of said tube.

22. An apparatus comprising:
    a hollow cylindrical tube providing a cylindrical surface shaped to be manually gripped to open and close a lid of a cooking apparatus, said tube hating at least one light source mounted therein, said tube and light source forming a one piece handle-light;
    at least one bracket having a circular opening therein sized for receiving and passing said one-piece handle-light therethrough, said bracket having an arm portion extending from said circular opening and dimensioned to attach said tube to a lid of a cooking apparatus in a position where said tube is both grippable to open and close said lid and is further oriented to direct light from said light source onto a cooking surface of said cooking apparatus.

23. The apparatus of claim 22 further including means cooperating with said at least one bracket for permitting said handle-light to rotate in said circular opening so as to aim said light source at said surface and for thereafter fixing said handle-light in a position where said light source is so aimed.

24. The apparatus of claim 23 wherein said means for permitting said handle-light to rotate comprises a set-screw.

25. An apparatus comprising:

a cooking apparatus having a lid openable to expose a cooking surface disposed beneath said lid;

a hollow cylindrical tube providing a cylindrical surface shaped to be manually gripped to open and close a lid of a cooking apparatus, said tube having at least one light source mounted therein, said tube and light source forming a one piece handle-light;

at least one bracket having a circular opening therein sized for receiving and passing said one-piece handle-light therethrough, said tube being positioned in said opening, said bracket further having an arm portion extending from said circular opening and attached to said lid, said arm portion being dimensioned to place said tube in a position where said tube is both grippable to open said lid and oriented to direct light from said light source onto a cooking surface of said cooking apparatus.

26. The apparatus of claim 25 further including means cooperating with said at least one bracket for permitting said handle-light to rotate in said opening so as to aim said light source at said surface and for thereafter fixing said handle-light in a position where said light source is so aimed.

27. The apparatus of claim 26 wherein said means comprises a set-screw.

28. An apparatus comprising:

a hollow cylindrical tube providing a cylindrical surface shaped to enable manual gripping of said tube, said tube having at least one light source mounted therein, said tube and light source forming a one piece handle-light;

means for attaching said one-piece handle-light to a lid of a cooking apparatus such that said tube is located a sufficient distance from said lid so as to be manually graspable to manually open said lid and such that said light source is manually moveable with respect to said lid so as to permit focusing of illumination from said light source onto a cooking surface of the cooking apparatus when said lid is open.

29. A method of providing illumination to a cooking surface comprising;

modifying a section of tubing by mounting a lighting apparatus within said tubing, said lighting apparatus including a light source, said tubing and lighting apparatus forming a one-piece handle-light assembly;

attaching at least one bracket to a lid of a cooking apparatus, said lid being openable to expose a cooking surface, said bracket having an opening therein sized to receive said one-piece handle-light assembly, said bracket spacing said tube apart from said lid such that said tube may be grasped to open said lid;

inserting said one-piece handle-light assembly through said opening; and orienting said light source so as to illuminate said cooking surface when said lid is open.

30. The method of claim 29 wherein said tubing is cylindrical and said opening is circular.

31. A method of providing illumination to a cooking surface further comprising:

modifying a section of circular tubing by mounting a lighting apparatus within said tubing, said lighting apparatus including a light source, said tubing and lighting apparatus forming a one-piece handle-light assembly;

providing a bracket having an arcuate surface at one end thereof and an ann supporting said arcuate surface, said ann having a length selected to dispose said tube in a position where said tube is graspable to open said lid;

attaching said bracket to a lid of a cooking apparatus, said lid being openable to expose a cooking surface;

placing said tube adjacent said arcuate surface; and turning said tube with respect to said surface so as to orient said light source in position to illuminate said cooking surface when said lid is open.

32. The apparatus of claim 1 wherein said tube has an axis lying parallel to a surface of said lid and wherein said light transmissive position directs light transversely to said axis toward said cooking surface.

* * * * *